Aug. 14, 1928.

A. C. SLOAN ET AL 1,680,917

CONNECTING ROD AND ITS COMPONENT BEARINGS

Filed Sept. 3, 1925        2 Sheets-Sheet 1

Aug. 14, 1928.   1,680,917
A. C. SLOAN ET AL
CONNECTING ROD AND ITS COMPONENT BEARINGS
Filed Sept. 3, 1925    2 Sheets-Sheet 2
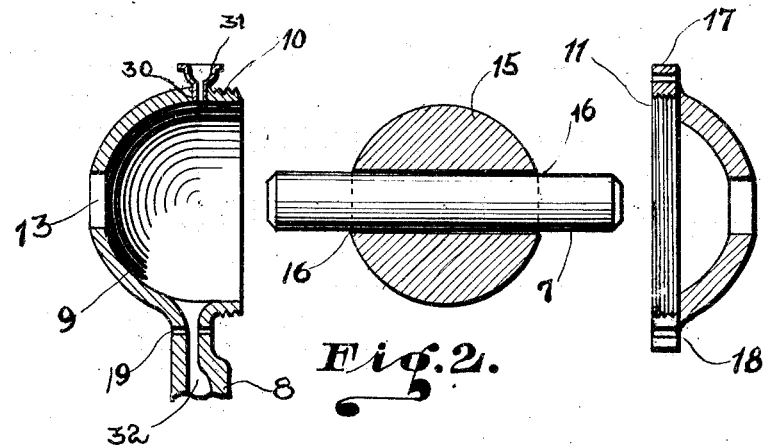
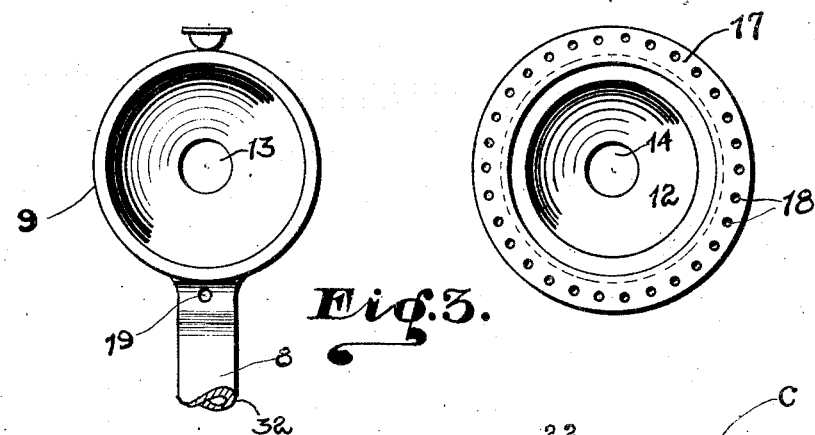
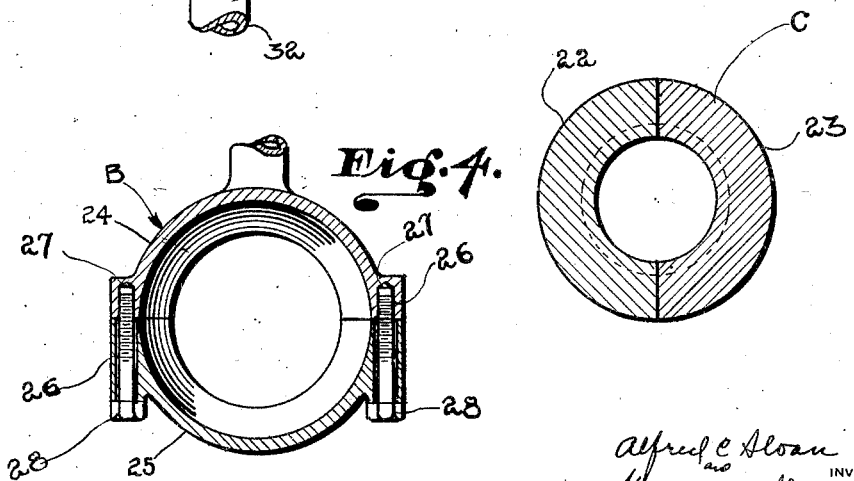

Patented Aug. 14, 1928.

1,680,917

UNITED STATES PATENT OFFICE.

ALFRED C. SLOAN, OF PHILADELPHIA, PENNSYLVANIA, AND STEPHEN M. SLOAN, OF VINELAND, NEW JERSEY.

CONNECTING ROD AND ITS COMPONENT BEARINGS.

Application filed September 3, 1925. Serial No. 54,341.

Generically this invention relates to connecting rods, but it more especially comprehends novel bearings for such rods.

An important object of this invention is the provision of a connecting rod terminating at each end in substantially universal bearings, so that a variation in alignment of said bearings will cause no side thrust of the piston or in any way affect the vertical reciprocation of said piston.

Another important object of this invention is to provide a connecting rod of this character constructed to automatically and continuously lubricate its component bearings.

Other objects of this invention are: to provide a connecting rod of this character having means for adjusting the tension of the bearing surfaces, means for locking the parts at any desired tension, adaptable to various types of piston and crank construction, adapted to be easily installed, economically manufactured and efficient for the purposes intended.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 2 is a sectional view of the upper bearing end of the connecting rod with the parts in disassembled relation, and the wrist pin in elevation;

Fig. 3 is a detail view of the outer casing members showing the flange of the removable section; and Fig. 4 is a sectional view of the lower bearing end of the connecting rod with the inner and outer members in disassembled relation.

Figure 1:
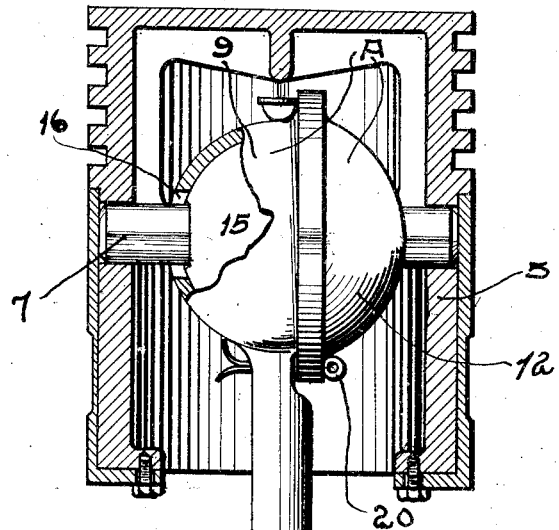
Fig. 1 is a perspective view of our improved connecting rod operatively positioned, with parts broken away, showing the piston in section and crank shaft in fragmentary elevation.
Figure 1:
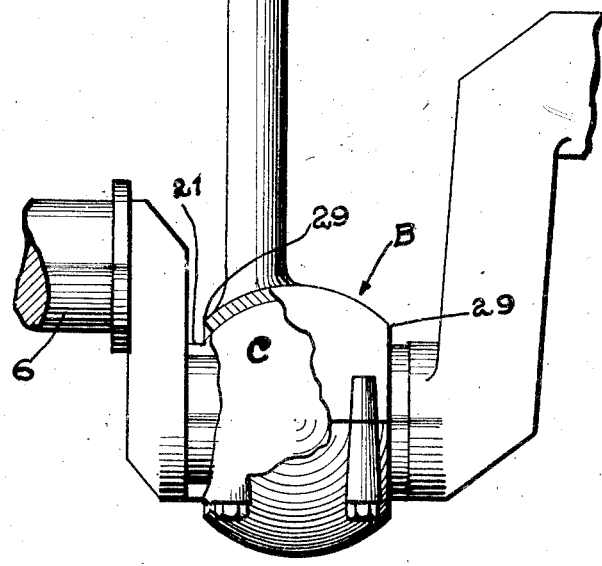

Such forms of connecting rods and bearing structures now in use and with which we are familiar have proved deficient in causing, under certain working conditions, a side thrust or uneven reciprocation of the piston with consequent injury to the cylinder walls, causing piston slaps, and by reason of improper lubrication, etc., being otherwise unsatisfactory, and it was to overcome such deficiencies, and to provide a connecting rod and bearing structure which could in no wise affect the free reciprocation of the piston by a variance in alignment of the crank shaft and wrist pin bearings, adapted to absorb certain engine vibrations to effect a smoother running motor, designed to at all times be automatically lubricated, easily installed and adjusted to varying stages of wear and tear, that we designed the connecting rod forming the subject matter of this invention.

In the illustrated embodiment characterizing this invention there is shown a piston 5, crank shaft 6 and wrist pin 7 of conventional design.

The connecting rod 8 is formed at its upper end with an integral substantially half spherical casing 9 exteriorly threaded as at 10 to engage the interior threads 11 of the complemental removable spherical section 12, which when operatively positioned forms the outer bearing casing A, and the sections 9 and 12 are centrally apertured as at 13 and 14, respectively, through which is adapted to extend the wrist pin 7, said openings being of greater diameter than the wrist pin to permit of the necessary universal movement of the casing with respect to the bearing 15.

The ball 15 constituting the bearing for the wrist pin 7 is formed with a central bore 16 and when mounted on said pin serves as a further bearing for the casing A when said casing has been operatively positioned thereover to comprise a composite wrist pin and connecting rod bearing, as clearly shown in Fig. 1 of the drawings.

The casing section 12 is formed with an outstanding or lateral flange 17 having a plurality of spaced peripheral apertures 18 adapted to selectively register with the horizontal opening 19 through which is adapted to extend a cotter pin or other fastening element 20 to securely lock the adjustable section 12 on the casing 9 at any desired tension with respect to the ball 15, as clearly shown in Fig. 1 of the drawings.

The lower or crank shaft end of the connecting rod 8 is also formed with an outer spherical casing B adapted to house a ball-like bearing C. The bearing C is longitudinally bored to correspond to the diameter of the crank shaft 6 and is formed with lateral extensions or flanges 21 to provide an inner bearing surface for the ball corresponding to that of the crank shaft and which also prevents lateral movement of the bearing.

In order that the bearing C may be expeditiously mounted on the crank shaft 6 it is longitudinally divided in the axial plane of the said shaft, forming upper and lower sections 22 and 23, respectively, and the casing B is similarly divided to form the upper and lower sections 24 and 25, respectively. Said sections being formed with exteriorly spaced ribs 26 on opposite sides thereof centrally bored as at 27 interiorly threaded to engage the exterior threads of the set screws or bolts 28, which latter when operatively positioned securely lock and tension the bearing C on the crank shaft 6 and the casing B on the spherical surface of the said bearing C to effect a composite universal connecting rod bearing similar in operation to the wrist pin bearing above described. The apertures 29 in the casing B are of greater diameter than the lateral extensions 21 so as to permit the necessary universal movement of the casing B with respect to the ball C, operating similar to the apertures 13 and 14 heretofore described.

An opening 30 is formed in the top of casing A into which is screwed or otherwise suitably secured an oil cup 31, and the connecting rod 8 is formed with a longitudinal passage or bore 32 extending therethrough and effecting communication between the casings A and B, so that as piston 5 is vertically reciprocated oil will be automatically deposited in the cup 31 lubricating the contacting surfaces of casing A and ball 15 and thence conducted through passage 32 to similarly effect lubrication of the casing C and bearing B.

The objects and operation of this invention would seem to be sufficiently clear from the above description, as to render further explanation thereof unnecessary.

Although in practice we have found that the form of our invention illustrated in the accompanying drawings and referred to in the above description as the preferred embodiment, is the most efficient and practical; yet realizing the conditions concurrent with the adoption of our device will necessarily vary, we desire to emphasize that various minor changes in details of construction, proportion and arrangement of parts, may be resorted to within the scope of the appended claims without departing from or sacrificing any of the principles of this invention.

Having thus described our invention, and without enumerating variations and equivalents, what we desire protected by Letters Patent is as set forth in the following claims:

1. A universal connection between a connecting rod and piston, comprising a wrist pin having a spherical member mounted thereon, a similar shaped housing enclosing the spherical member and formed in complemental sections, said sections adapted for threaded engagement and longitudinal adjustment with respect to the wrist pin, and means for locking the sections in adjusted position.

2. A universal connection between a connecting rod and piston, comprising a wrist pin having a spherical member mounted thereon, a similar shaped housing enclosing the spherical member and formed in complemental sections, said sections adapted for interlocking engagement and longitudinally adjustable with respect to the wrist pin, one of said sections having a peripheral flange, and means associated with the flange and connecting rod to lock the sections in adjusted position.

3. A universal connection between a connecting rod and piston, comprising a wrist pin having a spherical member mounted thereon, a similar shaped housing enclosing the spherical member and formed in complemental sections, said sections adapted for interlocking engagement and longitudinally adjustable with respect to the wrist pin, one of said sections having a peripheral flange, said flange having a circumferential series of apertures adapted to selectively register with a similar opening in the connecting rod, and means insertible in such openings to lock the sections in adjusted position.

4. A universal connection between a connecting rod and piston, comprising a wrist pin and associated spherical member, a similar shaped housing enclosing the spherical member and formed in complemental sections longitudinally adjustable with respect to the wrist pin, one of said sections being formed integral with the connecting rod, the other section having a lateral or peripheral flange, and means adapted to coact with said flange and connecting rod to maintain said sections in adjusted position with respect to said spherical member.

5. A universal connection between a connecting rod and piston, comprising a wrist pin and associated spherical member, a similar shaped housing enclosing the spherical member and formed in complemental sections longitudinally adjustable with respect to the wrist pin, one of said sections having means for automatically effecting the lubrication of the inner surface of the housing and contacting surface of the spherical member, and means for locking the sections in adjusted position.

6. A universal connection between a connecting rod and piston, comprising a wrist pin having a spherical member mounted thereon, a similar shaped housing enclosing the spherical member and formed in complemental sections longitudinally adjustable with respect to the wrist pin, oil collecting means mounted exterior of one of the sections for automatically effecting lubrication of the interior of the housing, and means for locking the sections in adjusted position.

ALFRED C. SLOAN.
STEPHEN M. SLOAN.